United States Patent Office 3,156,619
Patented Nov. 10, 1964

3,156,619
20α(β-[N,N - DIMETHYL - AMINO] - ETHYLAMINO)-
19 - NOR - Δ$^{1,3,5(10)}$ - PREGNATRIENES, PROCESS
FOR PREPARATION THEREOF AND METHOD
OF TREATMENT
Daniel Bertin, Montrouge, and Lucien Nedélec, Clichy-sous-Bois, France, assignors to Roussel-UCLAF, S.A., Paris, France, a corporation of France
No Drawing. Filed June 17, 1963, Ser. No. 288,551
Claims priority, application France, June 25, 1962, 901,845; Sept. 24, 1962, 910,263; May 6, 1963, 933,795
31 Claims. (Cl. 167—65)

The invention relates to novel amino steroids having the formula:

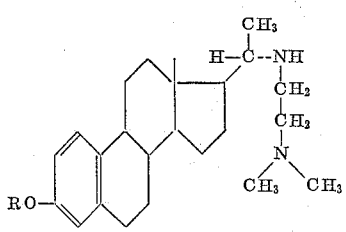

(I)

wherein R is selected from the group consisting of hydrogen, a lower alkyl radical having 1 to 7 carbon atoms and an acyl radical of an organic carboxylic acid having 1 to 18 carbon atoms and their non-toxic, pharmaceutically acceptable acid addition salts as well as a novel process for their preparation and novel intermediates therefor. The invention also relates to novel compositions having antilipemic and hypocholesterolemiantic activity and to a novel method for the treatment of hyperlipemia and hypercholesterolemia.

It is an object of the invention to provide novel 3-oxygenated - 20α - (β - [N,N - dimethylamino] - ethylamino)-19-nor-Δ$^{1,3,5(10)}$-pregnatrienes of Formula I and their non-toxic, pharmaceutically acceptable acid addition salts.

It is another object of the invention to provide a novel process for the preparation of 3-oxygenated-20α-(β-[N,N-dimethylamino] - ethylamino) - 19 - nor - Δ$^{1,3,5(10)}$ - pregnatrienes of Formula I.

It is an additional object of the invention to provide novel intermediates for 3-oxygenated-20α-(β-[N,N-dimethylamino] - ethylamino) - 19 - nor - Δ$^{1,3,5(10)}$ - pregnatrienes of Formula I.

It is a further object of the invention to provide novel compositions having antilipemic and hypocholesterolemiantic activity.

It is another object of the invention to provide a novel method for the treatment of hyperlipemia and hypercholesterolemia.

These and other objects and advantages of the invention will become obvious from the following detailed description.

The novel amino steroids of the invention are selected from the group consisting of 20α-(β-[N,N-dimethylamino] - ethylamino) - 19 - nor - Δ$^{1,3,5(10)}$ - pregnatrienes having the formula:

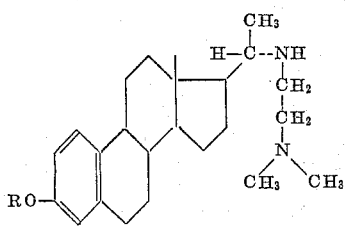

(I)

wherein R is selected from the group consisting of hydrogen, a lower alkyl radical having 1 to 7 carbon atoms and an acyl radical of an organic carboxylic acid having 1 to 18 carbon atoms and their non-toxic, pharmaceutically acceptable acid addition salts.

Examples of suitable non-toxic, pharmaceutically acceptable acid addition salts are the citrate, tartrate, maleate, ascorbate, gluconate, lactate, succinate, phosphate, sulfate, hydrobromide, hydrochloride, etc.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

The novel amino pregnatrienes of the invention possess interesting physiological properties, particularly antilipemic and hypocholesterolemiantic activities and lack any estrogenic activity. For example, the hypocholesterolemiantic activity of 20α-(β-[N,N-dimethylamino]-ethylamino)-19-nor-Δ$^{1,3,5(10)}$-pregnatriene-3-ol is almost twice that of 20α-(β-[N,N-dimethylamino]-ethylamino)-5α-pregnane-3β-ol (United States Patent No. 3,013,008) under oral administration.

The novel process of the invention for the preparation of 3-OR-20α-(β-[N,N-dimethylamino]-ethylamino)-19-nor-Δ$^{1,3,5(10)}$-pregnatrienes wherein R is selected from the group consisting of hydrogen, a lower alkyl having 1 to 7 carbon atoms and an acyl radical of an organic carboxylic acid having 1 to 18 carbon atoms comprises condensing hydroxylamine with 3-OR-19-nor-Δ$^{1,3,5(10)}$-pregnatriene-20-one wherein R has the above definition in the presence of a tertiary base to form 3-OR-20-oximido-19-nor-Δ$^{1,3,5(10)}$-pregnatriene, catalytically hydrogenating the latter to form 3-OR-20α-amino-19-nor-Δ$^{1,3,5(10)}$-pregnatriene, condensing the latter with an N,N-dimethylglycyl halide to form 3-OR'-20α-(N,N-dimethylaminoacetamido)-19-nor-Δ$^{1,3,5(10)}$-pregnatriene wherein R' is selected from the group consisting of an alkyl radical having 1 to 7 carbon atoms and an acyl radical of an organic carboxylic acid having 1 to 18 carbon atoms, reducing the latter with a mixed metal hydride to form 3-OR-20α-(β-[N,N-dimethylamino]-ethylamino)-19-nor-Δ$^{1,3,5(10)}$-pregnatriene wherein R has the above definition. The reaction scheme is outlined in Table I.

TABLE I

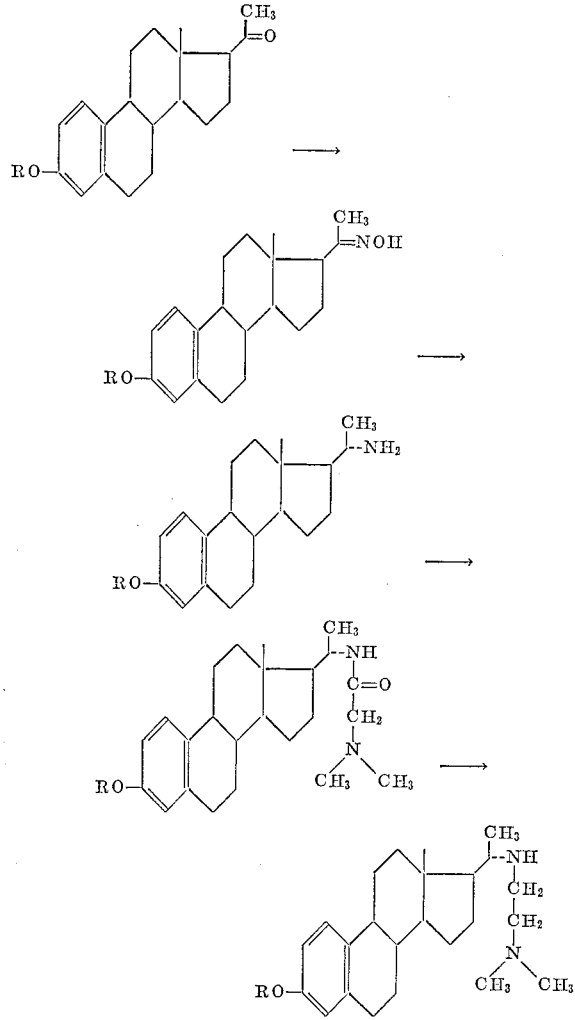

wherein R is selected from the group consisting of hydrogen, an alkyl radical having 1 to 7 carbon atoms and an acyl radical of an organic carboxylic acid having 1 to 18 carbon atoms and R' is selected from the group consisting of an alkyl radical having 1 to 7 carbon atoms and an acyl radical of an organic carboxylic acid having 1 to 18 carbon atoms.

If R is hydrogen when 3-OR-20α-amino-19-nor-$\Delta^{1,3,5(10)}$-pregnatriene is condensed with the N,N-dimethylglycyl halide, R' in 3-OR'-20α-(N,N-dimethylaminoacetamido)-19-nor-$\Delta^{1,3,5(10)}$-pregnatriene will be a N,N-dimethylaminoacetoxy group which is saponified under alkaline conditions before the reduction step. This step is not required if R is an alkyl or an acyl radical.

A preferred mode of the process for the preparation of 20α-(β-[N,N-dimethylamino]-ethylamino)-19-nor-$\Delta^{1,3,5(10)}$-pregnatriene-3-ol comprises condensing 19-nor-$\Delta^{1,3,5(10)}$-pregnatriene-3-ol-20-one with hydroxylamine in the presence of pyridine to form 20-oximido-19-nor-$\Delta^{1,3,5(10)}$-pregnatriene-3-ol, catalytically hydrogenating the latter in the presence of platinum oxide in acetic acid to form 20α-amino-19-nor-$\Delta^{1,3,5(10)}$-pregnatriene-3-ol, condensing the latter with N,N-dimethylglycyl chloride in a mixture of triethylamine and dimethylformamide to form 3-(dimethylaminoacetoxy)-20α-(N,N-dimethylaminoacetamido)-19-nor-$\Delta^{1,3,5(10)}$-pregnatriene, saponifying the latter with methanolic sodium hydroxide to form 20α-(N,N-dimethylaminoacetamido)-19-nor-$\Delta^{1,3,5(10)}$-pregnatriene-3-ol and reducing the latter with lithium aluminum hydride in the presence of aluminum chloride in tetrahydrofuran to form 20α-(β-[N,N-dimethylamino]-ethylamino)-19-nor-$\Delta^{1,3,5(10)}$-pregnatriene-3-ol.

Instead of beginning with a 3-alkoxy derivative of 19-nor-$\Delta^{1,3,5(10)}$-pregnatriene-3-ol-20-one, the products of Formula I wherein R is an alkyl radical having 1 to 7 carbon atoms can be also prepared by forming an alkali metal salt of 20α-(N,N-dimethylaminoacetamido)-19-nor-$\Delta^{1,3,5(10)}$-pregnatriene-3-ol, reacting the latter with a lower alkyl sulfate such as dimethylsulfate to form a 3-lower alkoxy - 20α - (N,N - dimethylaminoacetamido) - 19-nor-$\Delta^{1,3,5(10)}$-pregnatriene and reducing the latter with a mixed metal hydride such as lithium aluminum hydride to form 3-lower alkoxy-20α-(β-[N,N-dimethylamino]-ethylamino)-19-nor-$\Delta^{1,3,5(10)}$-pregnatriene. These latter compounds can be also prepared by direct etherification of 20α-(β-[N,N - dimethylamino] - ethylamino) - 19 - nor-$\Delta^{1,3,5(10)}$-pregnatriene-3-ol by means of an alkyl sulfate, such as dimethylsulfate.

The novel compositions having antilipemic and hypocholesterolemiantic activity are comprised of an amino steroid selected from the group consisting of 20α-(β-[N,N - dimethylamino] - ethylamino) - 19 - nor - $\Delta^{1,3,5(10)}$-pregnatrienes having the formula

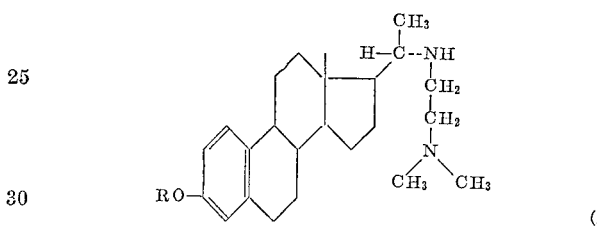

(I)

wherein R is selected from the group consisting of hydrogen, a lower alkyl radical having 1 to 7 carbon atoms and an acyl radical of an organic carboxylic acid having 1 to 18 carbon atoms and their non-toxic, pharmaceutically acceptable acid addition salts and a major amount of a pharmaceutical carrier. The compositions may be prepared in the form of injectable solutions or suspensions, prepared in ampules, in multiple-dose flacons, in the form of tablets, gelatin coated drops, suspensions, syrups and in the form of suppositories.

The compositions may be used for the treatment of acute or chronic hyperlipemia, of atheromatosis, of hepatic or toxic steatosis and lipoid nephrosis or for the treatment of hypercholesterolemia for which it is a curative or preventative agent, arterial disturbances, cerebral arthritis, aortitis, coronaritis, chest angina, arthritis of lower members, hypertension, deafness, buzzing of the ears, chronic nephritis, familial xanthomatosis and thyroidal insufficiency.

The novel method of treating hyperlipemia and hypercholesterolemia comprises administering daily an effective amount of an amino steroid selected from the group consisting of 20α-(β-[N,N-dimethylamino]-ethylamino)-19-nor-$\Delta^{1,3,5(10)}$-pregnatrienes having the formula

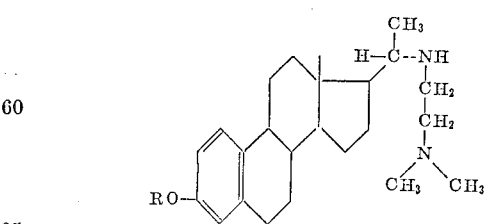

wherein R is selected from the group consisting of hydrogen, a lower alkyl radical having 1 to 7 carbon atoms and an acyl radical of an organic carboxylic acid having 1 to 18 carbon atoms and their non-toxic, pharmaceutically acceptable acid addition salts. The said amino steroids can be administered orally, transcutaneously or rectally. The usual dosage is 1 to 20 mg. per dose and per day depending upon the method of administration.

The starting materials for the process of the invention, namely 3-OR-19-nor-$\Delta^{1,3,5(10)}$-pregnatriene-20-ones wherein R has the above definition, are prepared according to the process described in French Patent No. 1,013,480.

In the following examples there are described several preferred embodiments to illustrate the invention. However, it should be understood that the invention is not intended to be limited to the specific embodiments.

*Example 1.—Preparation of 20α-(β-[N,N-Dimethylamino]-Ethylamino)-19-Nor-$\Delta^{1,3,5(10)}$-Pregnatriene-3-Ol*

STEP A.—PREPARATION OF 20-OXIMIDO-19-NOR-$\Delta^{1,3,5(10)}$-PREGNATRIENE-3-OL

A reaction mixture of 16 gm. of 19-nor-$\Delta^{1,3,5(10)}$-pregnatriene-3-ol-20-one, 160 cc. of pyridine and 10 gm. of hydroxylamine hydrochloride was maintained at about 85° C. under an atmosphere of nitrogen with agitation for a period of about an hour and a half. At the end of the reaction, 500 cc. of water were slowly added to the hot reaction mixture and the mixture was cooled. The crystalline precipitate formed was vacuum filtered, washed with water and taken up in boiling ethanol. Water was slowly added to the solution which was then iced and the crystals formed were vacuum filtered, washed with aqueous ethanol and dried to obtain 15 gm. of 20-oximido-19-nor-$\Delta^{1,3,5(10)}$-pregnatriene-3-ol.

The product upon recrystallization from isopropanol had a melting point of 234–236° C. and a specific rotation $[\alpha]_D^{20}=+67°$ (c.=1% in ethanol).

The product was soluble in alcohols, slightly soluble in ethyl acetate and insoluble in ether, benzene and chloroform.

*Analysis.*—$C_{20}H_{27}O_2N$: molecular weight=313.43. Calculated: C, 76.63%; H, 8.68%; N, 4.46%. Found: C, 76.9%; H, 8.5%; N, 4.2%.

This compound is not described in the literature.

The starting compound, 19-nor-$\Delta^{1,3,5(10)}$-pregnatriene-3-ol-20-one, was prepared according to the method described in French Patent No. 1,013,480.

STEP B.—PREPARATION OF 20α-AMINO-19-NOR-$\Delta^{1,3,5(10)}$-PREGNATRIENE-3-OL 4.07 g. of 20-oximido-19-nor-$\Delta^{1,3,5(10)}$-pregnatriene-3-ol were dissolved in 300 cc. of acetic acid and allowed to crystallize. At the same time, 0.815 g. of platinum oxide in 100 cc. of acetic acid were hydrogenated. The suspension of the said product obtained above and 210 cc. of acetic acid were then added to the catalyst mixture and the reaction mixture was subjected to hydrogenation for a period of four hours under agitation. The catalyst was then separated by filtration and the solution was distilled to dryness. The residue was taken up in a mixture of ethanol and ether and gaseous hydrochloric acid was allowed to bubble through the suspension until acidification. Then after solution, a start of crystallization was observed and the suspension was agitated for a period of about 45 minutes. The crystals formed were vacuum filtered and washed successively with a mixture of ether and ethanol and by ether. The product was recrystallized from aqueous ethanol to obtain 2.51 g. of the hydrochloride of 20α-amino-19-nor-$\Delta^{1,3,5(10)}$-pregnatriene-3-ol having a melting point of greater than 300° C.

This compound is not described in the literature.

This product was dissolved in 40 cc. of aqueous ethanol and 5 cc. of triethylamine and 150 cc. of water were added successively. The mixture was agitated for a period of about an hour and the precipitate formed was vacuum filtered, washed with water and dissolved in hot ethanol and the solution was then concentrated. 1.786 g. of 20α-amino-19-nor-$\Delta^{1,3,5(10)}$-pregnatriene-3-ol were obtained which upon recrystallization from ethanol had a melting point of 234° C. and a specific rotation $[\alpha]_D^{20}=+66° \pm 2°$ (c.=0.75% in ethanol).

The product was soluble in hot alcohols and slightly soluble in ether, acetone, benzene, chloroform and dilute aqueous acids.

*Analysis.*—$C_{20}H_{29}ON$: molecular weight = 299.44. Calculated: C, 80.22%; H, 9.76%; N, 4.68%. Found: C, 80.4%; H, 9.6%; N, 5.1%.

This compound is not described in the literature.

STEP C.—PREPARATION OF 20α-(N,N-DIMETHYLAMINO - ACETAMIDO)-19-NOR-$\Delta^{1,3,5(10)}$-PREGNATRIENE-3-OL 0.9 g. of 20α-amino-19-nor-$\Delta^{1,3,5(10)}$-pregnatriene-3-ol were dissolved in 23 cc. of dimethylformamide and 5.6 cc. of triethylamine and then the solution was cooled to +5° C. 2.37 g. of the hydrochloride of N,N-dimethylglycyl chloride were added slowly and the reaction mixture was agitated under nitrogen at 18–20° C. for a period of about 3 hours. The reaction mixture was then poured into a mixture of sodium bicarbonate, water and ice. The solution was agitated for a period of about 45 minutes at room temperature and extracted several times with benzene. The combined extracts were washed successively with a solution of sodium bicarbonate, with water and with a saturated solution of sodium chloride, then dried over magnesium sulfate and distilled to dryness to obtain 1.5 g. of raw 3-(N,N-dimethylaminoacetoxy)-20α-(N,N-dimethylaminoacetamido) - 19 - nor-$\Delta^{1,3,5(10)}$-pregnatriene.

This compound is not described in the literature.

All of the above product was taken up with 15 cc. of methanol and 2.4 cc. of a 5 N solution of sodium hydroxide and the mixture was subjected to agitation under nitrogen at room temperature for a period of about an hour. Then 50 cc. of water were added and a stream of carbon dioxide was made to pass therethrough until the pH reached a value of 7–8. 3 cc. of triethylamine were then added and the solution was extracted several times with benzene. The combined extracts were washed successively with water and with a saturated solution of sodium chloride, dried over magnesium sulfate, and distilled to dryness. The crystals formed were washed with ether and then dissolved in ethanol. After the solution was concentrated, water was added and the crystals formed were vacuum filtered and washed with aqueous ethanol. 0.898 g. of 20α-(N,N-dimethylaminoacetamido)-19-nor-$\Delta^{1,3,5(10)}$pregnatriene-3-ol were obtained which upon recrystallization from ethanol had a melting point of 225–226° C. and a specific rotation $[\alpha]_D^{20}=+67.5°$ (c.=0.7% in ethanol).

The product was soluble in chloroform, soluble in hot alcohols, slightly soluble in benzene and insoluble in ether.

*Analysis.*—$C_{24}H_{36}O_2N_2$: molecular weight=384.54. Calculated: C, 74.96%; H, 9.44%; N, 7.29%. Found: C, 75.0%; H, 9.2%; N, 7.5%.

This compound is not described in the literature.

STEP D.—PREPARATION OF 20α-(β-[N,N-DIMETHYLAMINO]-ETHYL AMINO)-19-NOR-$\Delta^{1,3,5(10)}$-PREGNATRIENE-3-OL 0.46 g. of lithium aluminum hydride were introduced into 25 cc. of tetrahydrofuran and after the mixture was cooled to +10° C., a solution of 1.33 gm. of aluminum chloride and 8 cc. of tetrahydrofuran was added. The mixture was agitated for a period of 10 minutes at room temperature and then 0.765 g. of 20α-(N,N-dimethylaminoacetamido)-19-nor-$\Delta^{1,3,5(10)}$-pregnatriene-3α-ol were introduced. The reaction mixture was heated to reflux under nitrogen and under agitation for a period of about 24 hours. 5 cc. of ethyl acetate, then 25 cc. of an aqueous solution of sodium chloride were added thereto. The precipitate was vacuum filtered, washed successively with benzene and with a mixture of benzene and ethanol. The residue was thereafter taken up with aqueous hydrochloric acid and the mixture was subjected to agitation for a period of a half hour at room temperature. The insoluble residue was vacuum filtered and washed with N/10 aqueous hydrochloric acid. The residue was dissolved in aqueous ethanol and 2 cc. of triethylamine were added to the solution which was then diluted with water. The dilute solution was extracted several times with benzene and the combined extracts were washed successively with water and with an aqueous solution of sodium chloride, dried over magnesium sulfate and distilled to dryness. The residue was taken up with ether and the product obtained was recrystallized from ethyl acetate to obtain 0.390 g. of 20α-(β-[N,N-dimethylamino]-ethyl amino)-19-nor-$\Delta^{1,3,5(10)}$-pregnatriene-3-ol having a melting point of 175° C. and a specific rotation $[\alpha]_D^{20}$= +80.5° (c.=0.8% in ethanol).

The product occurred in the form of needles and was soluble in alcohol and chloroform, hot ethyl acetate and dilute aqueous acids, moderately soluble in benzene and slightly soluble in ether.

*Analysis.*—$C_{24}H_{38}ON_2$: molecular weight=370.56. Calculated: C, 77.78%; H, 10.34%; N, 7.56%; O, 4.32%. Found: C, 78.2%; H, 10.0%; N, 7.8%; O, 4.6%.

Its infrared spectra (in solution in chloroform) showed a weak OH band and general absorption between 2400 and 3300 cm.$^{-1}$.

This compound is not described in the literature.

It can be easily characterized in the form of a salt such as that of the dihydrochloride.

EXAMPLE II.—*Preparation of 3-Methoxy-20α-(β-[N,N-Dimethylamino] - Ethyl Amino) - 19 - Nor - $\Delta^{1,3,5(10)}$ - Pregnatriene*

STEP A.—PREPARATION OF 3-METHOXY-20α-(N,N-DIMETHYLAMINO - ACETAMIDO) - 19-NOR-$\Delta^{1,3,5(10)}$-PREGNATRIENE 384 mg. of 20α-(N,N-dimethylaminoacetamido)-19-nor-$\Delta^{1,3,5(10)}$-pregnatriene-3-ol, prepared as described in Step C of Example I were dissolved in 10 cc. of benzene and 0.9 cc. of a 1.35 N solution of sodium methanolate in methanol. The methanol was then distilled therefrom while maintaining the liquid level constant by the addition of benzene. When the methanol was eliminated, the heating was discontinued and a precipitate of the sodium salt of 20α - (N,N - dimethylaminoacetamido) - 19 - nor-$\Delta^{1,3,5(10)}$-pregnatriene-3-ol was formed. 5 cc. of dimethylformamide were added and after solution of the precipitate, 1 cc. of a solution of 1.1 cc. of dimethyl sulfate in 8.9 cc. of benzene was added. The reaction mixture was then heated to reflux for a period of about one hour in the absence of moisture and under nitrogen and the reaction mixture was then poured into a dilute solution of sodium hydroxide. The mixture was extracted with a 1:1 mixture of benzene and ether. The extracts were combined, washed with water, dried and distilled to dryness to obtain 336 mg. of raw 3 - methoxy - 20α - (N,N - dimethylaminoacetamido) - 19 - nor - $\Delta^{1,3,5(10)}$ - pregnatriene. This compound was recrystallized several times from isopropyl ether and the purified product had a melting point of 145° C. and a specific rotation $[\alpha]_D^{20}$=+65° (c.=0.8% in ethanol).

The product was soluble in alcohols and chloroform and insoluble in water and dilute aqueous acids.

*Analysis.*—$C_{25}H_{38}O_2N_2$: molecular weight=398.57. Calculated: C, 75.34%; H, 9.61%; N, 7.03%. Found: C, 75.7%; H, 9.3%; N, 7.3%.

This compound is not described in the literature.

STEP B.—PREPARATION OF 3-METHOXY-20α-(β-[N,N-DIMETHYLAMINO] - ETHYL AMINO) - 19-NOR-$\Delta^{1,3,5(10)}$-PREGNATRIENE 555 mg. of lithium aluminum hydride were introduced under agitation and under an atmosphere of nitrogen into 30 cc. of tetrahydrofuran and then a solution of 1.59 g. of aluminum chloride in 11 cc. of tetrahydrofuran and a solution of 916 mg. of 3-methoxy-20α-(N,N-dimethylaminoacetamido) - 19 - nor - $\Delta^{1,3,5(10)}$ - pregnatriene in 15 cc. of tetrahydrofuran were added successively thereto. The mixture was heated to reflux for a period of about 16 hours. Then the reaction mixture was cooled to 0° C. and 30 cc. of 2 N sodium hydroxide solution and 30 cc. of benzene were added successively. The reaction mixture was filtered and the aqueous phase was decanted. The mother liquor was extracted with benzene and the benzenic phase was washed with saturated salt water, dried and distilled to dryness. The residue which was raw 3 - methoxy - 20α - (β - [N,N - dimethylamino] - ethylamino) - 19 - nor - $\Delta^{1,3,5(10)}$ - pregnatriene was next dissolved in ethanol and after the solution was filtered, 1.6 cc. of a solution of 4.6 N hydrochloric acid in ethanol were added. The solution was iced and the crystals formed were separated and dissolved in refluxing ethanol. The solution was filtered and iced and the crystals were separated and dried to obtain 650 mg. of the dihydrochloride of 3 - methoxy - 20α - (β - [N,N - dimethylamino] - ethylamino) - 19 - nor - $\Delta^{1,3,5(10)}$ - pregnatriene. The purified product had a melting point with decomposition of 250–260° C. and a specific rotation $[\alpha]_D^{20}$=+59° (c.=0.85% in methanol and 10% in water).

The product was very soluble in water and alcohols and insoluble in ether and chloroform.

*Analysis.*—$C_{25}H_{42}ON_2Cl_2$: molecular weight=457.5. Calculated: C, 65.65%; H, 9.25%; N, 6.12%; O, 15.50%. Found: C, 65.7%; H, 9.0%; N, 6.1%; O, 15.0%.

This compound is not described in the literature.

*Pharmacological Study of 20α-(β-[N,N-Dimethylamino]-Ethylamino) - 19 - Nor - $\Delta^{1,3,5(10)}$ - Pregnatriene-3-Ol*

I. HYPOCHOLESTEROLEMIANTIC ACTIVITY

A. *On the normal adult rat.*— This test was made on 2 groups of 10 rats fed a normal diet. One group of the animals were treated five times a week for a period of 15 days at a level of 2 mg./kg. per day with 20α-(β-[N,N-dimethylamino]-ethyl amino) - 19 - nor - $\Delta^{1,3,5(10)}$-pregnatriene-3-ol (in suspension in an aqueous solution of carboxymethyl cellulose containing 0.5% of the product) administered orally. The other group of rats serving as a control received orally the corresponding volume of the solvent. The level of cholesterol was determined on the blood serum according to the method of Sperry and Webb, modified by Herbain (Bull. Soc. Chim. Biol., 1959, 41, 821). The blood samples were taken from the ophthalmic plexus. The results summarized in Table II show an important lowering of the cholesterolemia in the normal rat.

TABLE II

| | Controls | | | Treated | | |
|---|---|---|---|---|---|---|
| | Cholesterol in grams/liter | | | Cholesterol in grams/liter | | |
| | 1st Day | 15th Day | Difference in Percent | 1st Day | 15th Day | Difference in Percent |
| 1 | 1.33 | 1.40 | +5 | 1.30 | 0.61 | −53 |
| 2 | 1.14 | 0.71 | −37 | 1.16 | 0.61 | −47 |
| 3 | 0.95 | 0.84 | −11 | 0.96 | 0.55 | −42 |
| 4 | 0.90 | 0.84 | −6 | 0.91 | 0.52 | −42 |
| 5 | 0.87 | 0.58 | −34 | 0.87 | 0.45 | −48 |
| 6 | 0.84 | 0.71 | −15 | 0.86 | 0.43 | −50 |
| 7 | 0.83 | 0.73 | −12 | 0.84 | 0.49 | −41 |
| 8 | 0.82 | 0.68 | −17 | 0.81 | 0.44 | −45 |
| 9 | 0.77 | | | 0.77 | 0.49 | −36 |
| 10 | 0.77 | 0.65 | −15 | 0.75 | 0.34 | −59 |
| Average | 0.92 | 0.79 | −14 | 0.92 | 0.49 | −46 |

B. *On the rat rendered hyperlipemic by the administration of Triton WR 1339.*—This test was effected on rats rendered strongly hyperlipemic and hypercholesterolemic by intravenous injection of Triton WR 1339 (p-isooctyloxyethylenephenol polymer) utilized at a dose of 4 g./kg. four months before the start of the treatment. The treated animals received 2 mg./kg. every 24 hours of 20α - (β - [N,N - dimethylamino] - ethyl amino) - 19-nor-$\Delta^{1,3,5(10)}$-pregnatriene-3-ol orally five times a week for a period of 15 days with normal feeding. The level of cholesterol was determined as before and the results summarized in Table III shows the lowering of cholesterolemia in the said rats.

TABLE III

| | Controls | | | Treated | | |
|---|---|---|---|---|---|---|
| | Cholesterol in grams/liter | | | Cholesterol in grams/liter | | |
| | Day 0 | Day 15 | Difference in Percent | Day 0 | Day 15 | Difference in Percent |
| 1 | 1.72 | 1.35 | −21 | 2.08 | 1.30 | −37 |
| 2 | 1.59 | 1.38 | −13 | 1.33 | 0.86 | −35 |
| 3 | 1.46 | 1.98 | +35 | 1.20 | 0.70 | −42 |
| 4 | 1.33 | 1.66 | +25 | 1.07 | 0.55 | −49 |
| 5 | 1.01 | 1.07 | +6 | 0.06 | 0.57 | −28 |
| 6 | 0.92 | 0.83 | −10 | 0.90 | 0.55 | −39 |
| 7 | 0.90 | 0.81 | −10 | 0.79 | 0.44 | −44 |
| 8 | 0.81 | 0.78 | −4 | | | |
| Average | 1.21 | 1.23 | +1.5 | 1.19 | 0.71 | −40 |

C. *On the adult rat subjected to a diet rich in cholesterol.*—A hyperlipemia of an alimentary origin was provoked in the adult rat by a diet rich in cholesterol (1%) mixed with 0.5% of cholic acid. Twenty animals were subjected to this diet for a period of 53 days and were then separated into two groups, (1) a control group and (2) a group receiving orally 2 mg./kg. per day of 20α-(β-[N,N-dimethylamino]-ethyl amino)-19-nor-Δ$^{1,3,5(10)}$-pregnatriene-3-ol for a period of 19 days. The same diet was applied throughout the duration of the treatment. The results summarized in Table IV show an important lowering of the cholesterol level and of the level of blood lipids in the hypercholesterolemic animal.

TABLE IV

| | CONTROLS | | TREATED | |
|---|---|---|---|---|
| | Cholesterol in g./l. | Lipids in g./l. | Cholesterol in g./l. | Lipids in g./l. |
| 1 | 3.92 | 12.61 | 2.16 | |
| 2 | 3.56 | | 1.56 | 8.06 |
| 3 | 3.43 | | 1.53 | 8.83 |
| 4 | 3.04 | 12.61 | 1.43 | 7.29 |
| 5 | 2.23 | 9.60 | 1.30 | 7.42 |
| 6 | 1.92 | | 1.22 | 6.53 |
| 7 | 1.77 | 7.87 | 1.17 | 7.42 |
| 8 | 1.53 | 7.55 | 1.17 | 6.53 |
| 9 | 1.35 | 7.87 | 1.14 | 5.50 |
| 10 | 1.27 | 6.65 | 1.09 | 7.29 |
| Average | 2.40 | 9.25 | 1.38 | 7.21 |

II. HYPOLIPEMIANTIC ACTIVITY ON THE POST-PRANDIAL LIPEMIA IN THE DOG

A lot of dogs was rendered hyperlipemic by ingestion of 10 g./kg. of body weight of cream from fresh milk containing 38% of fatty materials. 20α-(β-[N,N-dimethylamino]-ethyl amino)-19-nor-Δ$^{1,3,5(10)}$-pregnatriene-3-ol in suspension in an aqueous dispersant at a rate of 5 mg./cc. had been mixed with the cream and ingested with it at a dose of 2 mg./kg. of body weight of the animals. Another lot of dogs serving as a control received only the fresh cream to which had been added a mixture of the corresponding value of aqueous dispersant.

Samples of the blood were made immediately after the ingestion of the fresh cream and 3, 5 and 7 hours after the ingestion. The blood recovered on an anticoagulant agent was centrifuged. The plasma was separated and its turbidity was evaluated photometrically in order to follow the evolution of the lipemia. The results are assembled in Table V.

TABLE V

| Lot | Plasmatic turbidity expressed in optic density | | | |
|---|---|---|---|---|
| | After 0 hrs. | After 3 hrs. | After 5 hrs. | After 7 hrs. |
| Controls | 0.16 | 0.97 | 0.56 | 0.56 |
| Treated | 0.10 | 0.41 | 0.38 | 0.36 |

III. LACK OF ESTROGENIC EFFECT

A single dose of 2 mg. of 20α-(β-[N,N-dimethylamino]-ethyl amino)-19-nor-Δ$^{1,3,5(10)}$-pregnatriene - 3 - ol was administered both subcutaneously and orally to castrated rats having an average weight of 200 g. Vaginal smears were then made every day for a period of one week and in no case was the presence of keratinized cells observed.

IV. DETERMINATION OF ACUTE TOXICITY

A test of toxicity was made on mice of the Rockland strain weighing between 18 and 22 g. 20α-(β-[N,N-dimethylamino]-ethyl amino)-19-nor - Δ$^{1,3,5(10)}$ - pregnatriene-3-ol in suspension in an aqueous dispersant was ingested orally in lots of ten mice at doses respectively of 50 and 100 mg./kg. The animals were held under observation for a period of 8 days. No symptoms of intoxication or of mortality were noted.

Various modifications of the compositions and method of the invention may be made without departing from the spirit or scope thereof and it is to be understood that the invention is intended to be limited only as defined in the appended claims.

We claim:

1. Amino steroids selected from the group consisting of an amino steroid having the formula:

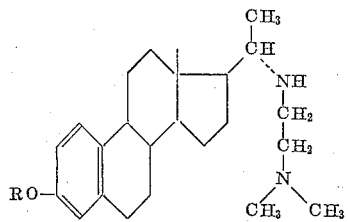

wherein R is selected from the group consisting of hydrogen, an alkyl having 1 to 7 carbon atoms and an acyl radical of an organic carboxylic acid having 1 to 18 carbon atoms and the non-toxic, pharmaceutically acceptable acid addition salts.

2. A compound selected from the group consisting of 20α-(β-[N,N-dimethylamino] - ethylamino) - 19 - nor-Δ$^{1,3,5(10)}$-pregnatriene-3-ol and its non-toxic, pharmaceutically acceptable acid addition salts.

3. 20α-(β-[N,N-dimethylamino]-ethylamino)-19 - nor-Δ$^{1,3,5(10)}$-pregnatriene-3-ol.

4. The dihydrochloride salts of 20α-[N,N-dimethylamino]-ethylamino)-19-nor-Δ$^{1,3,5(10)}$-pregnatriene-3-ol.

5. A compound selected from the group consisting of 3-methoxy-20α-(β-[N,N - dimethylamino] - ethylamino)-19-nor-Δ$^{1,3,5(10)}$-pregnatriene, and its non-toxic pharmaceutically acceptable acid addition salts.

6. The dihydrochloride salt of 3 - methoxy - 20α-(β-[N,N-dimethylamino]-ethylamino)-19-nor - Δ$^{1,3,5(10)}$-pregnatriene.

7. 3-methoxy-20α - (β - [N,N - dimethylamino] - ethylamino)-19-nor-Δ$^{1,3,5(10)}$-pregnatriene.

8. A compound having the formula:

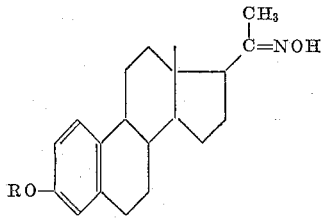

wherein R is selected from the group consisting of hydrogen, a lower alkyl having 1 to 7 carbon atoms and an acyl radical of an organic carboxylic acid having 1 to 18 carbon atoms.

9. 20-oximido-19-nor-$\Delta^{1,3,5(10)}$-pregnatriene-3-ol.

10. A compound selected from the group consisting of a compound having the formula:

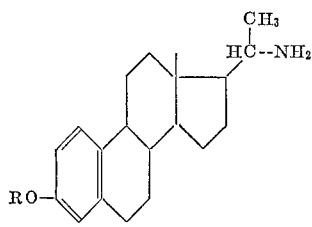

wherein R is selected from the group consisting of hydrogen, an alkyl having 1 to 7 carbon atoms and an acyl radical of an organic carboxylic acid having 1 to 18 carbon atoms and its acid addition salts.

11. The hydrochloride salt of 20α-amino-19-nor-$\Delta^{1,3,5(10)}$-pregnatriene-3-ol.

12. 20α-amino-19-nor-$\Delta^{1,3,5(10)}$-pregnatriene-3-ol.

13. A compound having the formula:

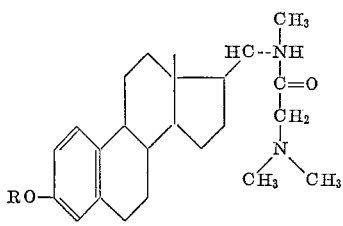

wherein R is selected from the group consisting of hydrogen, a lower alkyl having 1 to 7 carbon atoms and an acyl radical of an organic carboxylic acid having 1 to 18 carbon atoms.

14. 3-dimethylaminoacetoxy-20α-(dimethylaminoacetamido)-19-nor-$\Delta^{1,3,5(10)}$-pregnatriene.

15. 20α-(dimethylaminoacetamido)-19-nor-$\Delta^{1,3,5(10)}$-pregnatriene-3-ol.

16. 3-methoxy-20α-(dimethylaminoacetamido)-19-nor-$\Delta^{1,3,5(10)}$-pregnatriene.

17. A process for the preparation of an amino steroid selected from the group consisting of a compound having the formula:

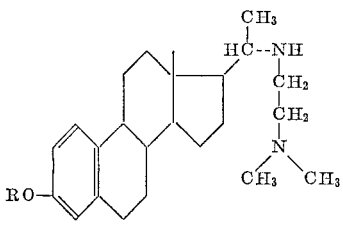

wherein R is selected from the group consisting of hydrogen, an alkyl having 1 to 7 carbon atoms and an acyl radical of an organic carboxylic acid having 1 to 18 carbon atoms which comprises condensing 3-OR-19-nor-$\Delta^{1,3,5(10)}$-pregnatriene-20-one wherein R has the above definition with hydroxylamine to form 3-OR-20-oximido-19-nor-$\Delta^{1,3,5(10)}$-pregnatriene, catalytically hydrogenating the latter to form 3-OR-20α-amino-19-nor-$\Delta^{1,3,5(10)}$-pregnatriene, condensing the latter with an N,N-dimethylglycyl halide to form 3-OR′-20α-(dimethylaminoacetamido)-19-nor-$\Delta^{1,3,5(10)}$-pregnatriene wherein R′ is a member selected from the group consisting of an alkyl having 1 to 7 carbon atoms and an acyl radical of an organic carboxylic acid having 1 to 18 carbon atoms, reducing the latter with a mixed metal hydride to form 3-OR-20α-(β-[N,N-dimethylamino]-ethylamino)-19-nor-$\Delta^{1,3,5(10)}$-pregnatriene and recovering the desired amino streoid.

18. The process of claim 17 wherein the condensation with hydroxylamine is effected in the presence of pyridine.

19. The process of claim 17 wherein the catalytic hydrogenation is effected in the presence of platinum oxide catalyst in acetic acid.

20. The process of claim 17 wherein the condensation with the N,N-dimethylglycyl halide is effected in a mixture of dimethylformamide and triethylamine.

21. The process of claim 17 wherein saponification of the 3-acyloxy group is effected with methanolic sodium hydroxide before the reduction when R is hydrogen.

22. The process of claim 17 wherein the reduction with a mixed metal hydride is effected with lithium aluminum hydride in the presence of aluminum chloride in tetrahydrofuran.

23. A process for the preparation of an amino steroid selected from the group consisting of 20α-(β-[N,N-dimethylamino]-ethylamino)-19-nor-$\Delta^{1,3,5(10)}$-pregnatriene-3-ol and its non-toxic, pharmaceutically acceptable acid addition salts which comprises condensing 19-nor-$\Delta^{1,3,5(10)}$-pregnatriene-3-ol-20-one with hydroxylamine to form 20-oximido-19-nor-$\Delta^{1,3,5(10)}$-pregnatriene-3-ol, catalytically hydrogenating the latter to form 20α-amino-19-nor-$\Delta^{1,3,5(10)}$-pregnatriene-3-ol, condensing the latter with N,N-dimethylglycyl chloride to form 3-dimethylaminoacetoxy-20α-(dimethylaminoacetamido)-19-nor-$\Delta^{1,3,5(10)}$-pregnatriene, saponifying the latter to form 20α-(dimethylaminoacetamido)-19-nor-$\Delta^{1,3,5(10)}$-pregnatriene-3-ol, reducing the latter with lithium aluminum hydride to form 20α-(β-[N,N-dimethylamino]-ethylamino)-19-nor-$\Delta^{1,3,5(10)}$-pregnatriene-3-ol and recovering the desired amino steroid.

24. A process for the preparation of an amino steroid selected from the group consisting of 3-lower alkoxy-20α-(β-[N,N-dimethylamino]-ethylamino)-19-nor-$\Delta^{1,3,5(10)}$-pregnatriene and its non-toxic, pharmaceutically acceptable acid addition salts which comprises condensing 19-nor-$\Delta^{1,3,5(10)}$-pregnatriene-3-ol-20-one with hydroxylamine to form 20-oximido-19-nor-$\Delta^{1,3,5(10)}$-pregnatriene-3-ol, catalytically hydrogenating the latter to form 20α-amino-19-nor-$\Delta^{1,3,5(10)}$-pregnatriene-3-ol, condensing the latter with N,N-dimethylglycyl chloride to form 3-dimethylaminoacetoxy-20α-(dimethylaminoacetamido)-19-nor-$\Delta^{1,3,5(10)}$-pregnatriene, saponifying the latter to form 20α-(dimethylaminoacetamido)-19-nor-$\Delta^{1,3,5(10)}$-pregnatriene-3-ol, reacting the latter with an alkali metal lower alkoxide followed by reaction with a lower alkyl sulfate to form 3-lower alkoxy-20α-(dimethylaminoacetamido)-19-nor-$\Delta^{1,3,5(10)}$-pregnatriene, reducing the latter with a mixed metal hydride to form 3-lower alkoxy-20α-(β-[N,N-dimethylamino]-ethylamino)-19-nor-$\Delta^{1,3,5(10)}$-pregnatriene and recovering the desired amino steroid.

25. Compositions having antilipemic and hypocholesterolemiantic activity comprising 1 to 20 mg. of amino steroid selected from the group consisting of 20α-(β-[N,N-dimethylamino]-ethylamino)-19-nor-$\Delta^{1,3,5(10)}$-pregnatrienes having the formula:

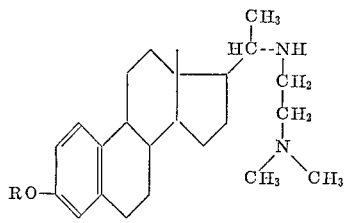

wherein R is selected from the group consisting of hydrogen, a lower alkyl having 1 to 7 carbon atoms and an acyl radical of an organic carboxylic acid having 1 to 18 carbon atoms and their non-toxic, pharmaceutically acceptable acid addition salts and a major amount of a pharmaceutical carrier.

26. The compositions of claim 25 wherein the amino steroid is 20α-(β-[N,N-dimethylamino]-ethylamino)-19-nor-$\Delta^{1,3,5(10)}$-pregnatriene-3-ol.

27. The compositions of claim 25 wherein the amino steroid is 3-methoxy-20α-(β-[N,N-dimethylamino]-ethylamino)-19-nor-$\Delta^{1,3,5(10)}$-pregnatriene.

28. A method of treating hyperlipemia and hypercholesterolemia comprising administering daily an effective amount of an amino steroid selected from the group consisting of 20α-(β-[N,N-dimethylamino]-ethylamino)-19-nor-$\Delta^{1,3,5(10)}$-pregnatrienes having the formula:

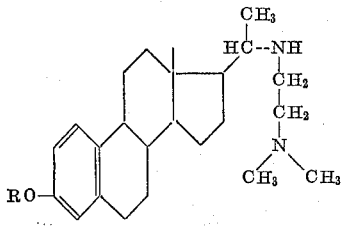

wherein R is selected from the group consisting of hydrogen, a lower alkyl having 1 to 7 carbon atoms and an acyl radical of an organic carboxylic acid having 1 to 18 carbon atoms and their non-toxic, pharmaceutically acceptable acid addition salts.

29. The method of claim 28 wherein the amino steroid is 20α - (β - [N,N - dimethylamino] - ethylamino) - 19-nor-$\Delta^{1,3,5(10)}$-pregnatriene-3-ol.

30. The method of claim 28 wherein the amino steroid is 3 - methoxy - 20α - (β - [N,N - dimethylamino] - ethylamino)-19-nor-$\Delta^{1,3,5(10)}$-pregnatriene.

31. The method of claim 28 wherein the effective amount is 1 to 20 mg.

References Cited in the file of this patent

Velluz et al.: Compt. Rend. 255, pp. 436–38 (1962).
Bertin et al.: Compt. Rend. 256, pages 960–62 (January 1963).